United States Patent [19]

von Bonin et al.

[11] Patent Number: 4,992,481

[45] Date of Patent: Feb. 12, 1991

[54] FIRE RETARDANT ELEMENTS

[75] Inventors: Wulf von Bonin, Odenthal; Ulrich von Gizycki, Leverkusen, both of Fed. Rep. of Germany

[73] Assignee: Bayer Aktiengesellschaft, Leverkusen, Fed. Rep. of Germany

[21] Appl. No.: 316,370

[22] Filed: Feb. 27, 1989

[30] Foreign Application Priority Data

Mar. 12, 1988 [DE] Fed. Rep. of Germany ....... 3808275

[51] Int. Cl.$^5$ .............................. C08J 9/40; C08J 9/42
[52] U.S. Cl. .......................................... 521/54; 521/55
[58] Field of Search ..................... 521/54, 55

[56] References Cited

U.S. PATENT DOCUMENTS

| | | | |
|---|---|---|---|
| 2,200,850 | 5/1940 | Miserentino | 521/55 |
| 2,926,390 | 3/1960 | Talalay et al. | 521/55 |
| 3,033,804 | 5/1962 | Bethe et al. | 521/54 |
| 3,057,750 | 10/1962 | Bennett et al. | 521/54 |
| 3,061,468 | 10/1962 | Tryon | 521/55 |
| 3,451,842 | 6/1969 | Kurz et al. | 521/55 |
| 3,547,840 | 12/1970 | Stastny et al. | 521/55 |
| 3,554,934 | 1/1971 | Ingram | 521/54 |
| 4,190,696 | 2/1980 | Hart et al. | 521/55 |
| 4,216,136 | 8/1980 | Stayner | 521/54 |
| 4,223,095 | 9/1980 | Esser et al. | 521/55 |
| 4,224,374 | 9/1980 | Priest | 521/54 |
| 4,288,559 | 9/1981 | Illger et al. | 521/55 |
| 4,425,440 | 1/1984 | Bloembergen et al. | 521/54 |
| 4,433,069 | 2/1984 | Harper | 521/54 |
| 4,455,396 | 6/1984 | Al-Tabagchall et al. | 521/55 |
| 4,529,742 | 7/1985 | van Bonin et al. | 521/107 |
| 4,547,526 | 10/1985 | Al-Tabagchall et al. | 521/55 |
| 4,644,014 | 2/1987 | Thomson et al. | 521/54 |
| 4,673,697 | 6/1987 | Rowley | 521/54 |
| 4,720,414 | 1/1988 | Burga | 428/141 |
| 4,935,452 | 6/1990 | Hill | 521/55 |

FOREIGN PATENT DOCUMENTS 0010714 5/1980 European Pat. Off. .
3306698 8/1984 Fed. Rep. of Germany .

*Primary Examiner*—Foelak Morton
*Assistant Examiner*—Rabon Sergent
*Attorney, Agent, or Firm*—Sprung Horn Kramer & Woods

[57] ABSTRACT

The new fire retardant elements are characterized in that they are foam mouldings which are elastic in the moist state and contain a liquid flameproofing impregnation, and the fire retardant elements are protected against moisture loss before installation and solidify on drying after installation. A process for the production of such fire retardant elements and mouldings which comprise such fire retardant elements are likewise described and claimed.

11 Claims, No Drawings

FIRE RETARDANT ELEMENTS

The present invention relates to fire retardant elements which can be used, in particular, as sealants for preventative flameproofing. The fire retardant elements according to the invention are installed in the moist, flexible state and are mechanically strengthened, flame resistant and, in some cases, substantially impermeable to gas after drying.

It is known (see, for example, DE-OS (German Published Specification) 2,649,222) to make certain foams fire resistant by impregnation. To this end, foams are used, in particular, which, after impregnation and drying, are as fire resistant as possible, but are as similar as possible mechanically to the starting foam. Thus, impregnated and dried foams are employed in the soundproofing, mattress and cushioning sector.

It is also known (see AEG-Telefunken Company publication Geaquelllo ® cable insulation system) to introduce an absorptive sponge of cellulose materials in dry and compressed form into a cavity and then to inject an aqueous slurry of fire retardant mortar or cement. During this operation, the absorptive sponge swells, absorbs the aqueous mortar or cement and thus prevents the mortar or cement running out of the cavity before setting. In this case, the sponge (in dry form) and the mortar or cement dispersion are introduced separately. This means: the dirtproducing production of the hydraulically setting composition and the casting thereof must be carried out on the spot. In addition, it is necessary to build shuttering.

It is furthermore known (Fire Journal, March 1986, page 41 ff.) to protect cable ducts or wall ducts against penetration of fire by walling up or sealing using fire retardant putties, fire retardant mortars, silicone foams or intumescent compositions (if appropriate in combination with mineral wool board). The rigidity and brittleness of the sealant material and the dirt-producing handling of mortars and dust-producing mineral wool components which have to be prepared and cast on the spot, and the complicated, precise fitting of the fire retardant composition, which is necessary in order to obtain room sealing with adequate impermeability to gas, are disadvantageous here.

Finally it is also known (for example Intumex ® PS system) to make the passage of fire more difficult by filling holes or ducts with small sacks filled with sand, intumescent materials and/or foam particles having a fire resistant character. However, such sacks do not allow narrow cracks, small holes and cavities having complicated geometrical shapes to be sealed impermeable to smoke, but instead cavities having complicated geometrical shapes tend to form. In addition, adhesion of the sacks to one another and to the surrounding material is inadequate, which means that it is only possible in this way to produce fire retardant seals which are not very stable mechanically. Although the mechanical properties of foams having a fire resistant character are relatively favourable, such components, in place of the sacks, are also unsuitable for long-term sealing. Since it is necessary that they are elastic before, during and after sealing of holes or ducts, a substantial proportion of organic material, which, in principle, counteracts fire resistance, is necessarily contained in them.

Surprisingly, the present invention does not have the abovementioned disadvantages of previous fire protection measures.

Fire retardant elements which have a long shelflife and can be installed in the elastic state have now been found which are characterized in that they
 (a) are foam mouldings which are elastic in the moist state and
 (b) contain a liquid flameproofing impregnation, where (a) and/or (b) solidify on drying after installation, and the fire retardant elements are protected against loss of moisture before installation.

These fire retardant elements can be introduced in the compressed state in the openings, joints and cavities to be sealed and then reliably seal the latter as a consequence of their flexibility and resilience. They can also be used in flat form, for example as a protective coating or as a bandage.

The fire retardant elements according to the invention have fire retardant properties even in the moist state, so long as they contain an aqueous impregnation. Nevertheless, they can generally be dried in the course of time together with the masonry under the conditions prevailing in each case.

On drying, the fire retardant elements according to the invention gain stability, for example against atmospheric influences. During drying, curing of the fire retardant elements can also take place, for example by the occurrence of crosslinking reactions. This means that it is necessary to protect the fire retardant elements according to the invention against premature drying and or curing before they are used, for example by suitable packing and storage. If, for example, film is chosen for a packing of this type, the fire retardant elements can be installed, if desired, in packed form, if necessary after opening the packing, since the fire load of the packing is then negligible.

On drying, shrinkage does not generally take place since it is prevented by the resilience of the compressed foam mouldings. The drying process causes adherent and sealing bonding of the fire retardant elements to one another and between them and the surrounding material, which can be, for example, masonry, metal or cable insulations. In addition, the drying process converts the fire retardant elements from the elastic state into a harder, mechanically stable state which is no longer reversibly compressible.

Since the foam mouldings of fire retardant elements according to the invention are flexible and since the binder in the flameproofing impregnation also introduces a certain toughness into the impregnation, fillings and seals produced using the fire retardant elements according to the invention do not have a brittle and crumbly character, as is the case, for example, in mortar or mineral fibre partitions, but instead they can be machined, for example drilled, without producing dust, an increasingly important criterion. The fillings and seals produced using fire retardant elements according to the invention are therefore also substantially more stable to vibrations and dynamic loads than brittle mortar seals which are susceptible to cracking.

Foam mouldings which can be used are those having very low specific gravity, and the flameproof impregnation may contain relatively small amounts of binders. It is thereby possible to produce fire retardant elements according to the invention using relatively small amounts of organic material without impairing their applicationally excellent serviceability. For example, fire classifications B 1 or A 2 (DIN 4102) can be achieved in many cases.

The type of the foam mouldings, the nature of the impregnation and the ratio of the amounts of impregnation and foam mouldings can be varied within broad limits. Fire retardant elements according to the invention can therefore be matched individually to the particular applicational requirements, for example with regard to dry specific gravity, adhesion properties, insulation capacity and impermeability to smoke.

In the foam mouldings, the number of pores can be, for example, 5 to 500 per $cm^2$ and the permeability to air can be, for example, 20 to 250 1 per 100 $cm^2$ at a thickness of 5 cm and a reduced pressure of 10 Pascals. These parameters are preferably 10 to 300 (number of pores) and 50 to 150 (permeability to air).

A further advantage of the fire retardant elements according to the invention is that they can be prefabricated as flexible elements which can be reversibly compressed and can still very easily be cut, drilled or worked in any other way immediately before use and the associated drying. In addition, accurate measurement and cutting of installation components and handling at the installation site of mortars, putties, casting dispersions, reactive systems, powder dusts, fibres and liquids are not necessary, which is very desirable for industrial hygiene reasons.

Fire retardant elements according to the invention can also be combined with already-known elements and measures for preventative flameproofing, for example in the sealing of cable spandrels and partition joints or in the covering of pipes and cable insulations, mineral wool boards, plastic components, wooden walls, walls or metal components.

The flameproofing impregnation can behave intumescently or non-intumescently. During or after combustion of the organic components, it can form a fire-resistant mineral structure of non-combustible fillers which optionally behaves endothermically and is optionally porous, and in some cases sinter, vitrify or melt and thus cause particularly effective room sealing and good insulation against the entry of flames and smoke. In order to make the combustion of the pyrolysis gases or of the organic component of the fire retardant elements more difficult, the impregnation may contain water, ammonia, carbon dioxide, nitrogen, phosphorus, antimony and/or halogen and/or eliminate these in the case of fire and release them into the region of the partition or the place of fire. These processes are additionally effective if they proceed endothermically. They may be supported by other endothermic processes proceeding in parallel, for example melting, sublimation, evaporation, dissociation, rearrangement, elimination or pore-producing processes, and the protective action of fire retardant elements according to the invention can be extended and improved in this way.

In this way, the fire retardant elements according to the invention can form, in the case of fire, an insulating protective zone, which is usually reinforced by minerals or built up from minerals and is thermally and mechanically stable up to temperatures of at least 400° C., preferably up to temperatures of greater than 1,000° C., and times up to at least 30 minutes, preferably up to more than 90 minutes.

Fire retardant elements according to the invention can be used, for example, for sealing joints, ducts for internal or external walls, or cable strands and for protecting or insulating pipes, load-bearing structures, partitioning, walls and containers. The fire retardant elements can be of any desired size and can be designed, for example as wallboards, components of external walls, ashlar, granules, quasi-continuous profiles, tapes, center split pipes, containers, pipe plugs or grids.

The non-volatile content of the impregnation is generally greater than 50% by weight, preferably greater than 100% by weight and particularly preferably 200 to 800% by weight, of the original foam moulding.

Fire retardant elements according to the invention are moist, impregnated, compressible foam mouldings. The compressible foam mouldings are preferably soft polyurethane foams which can be compressed substantially reversibly (=elastic). However, they may also be other organic and/or inorganic foam mouldings, for example those based on asbestos, mineral fibres, silicone, phosphazene foams, mixed inorganic/organic foams, cellulose foams, protein foams, natural sponges, phenolic resin foams, urea resin foams, melamine resin foams, dicyandiamide resin foams or polyimide resin foams, foams based on polymers foamed in dispersion, solution or directly, such as natural or synthetic rubbers, polyolefins, polyacrylates, polyamides, polyethers, polyesters, poly(vinyl halides), poly(vinyl esters) or poly(vinyl ethers).

In at least some cases, open-pored foams are preferably employed in order to simplify penetration of the impregnation, for example so-called reticulated foams, whose cells have been opened, for example, by mechanical treatment. The foam mouldings may optionally contain organic and/or inorganic fillers and/or fibres. They may also be built up from crosslinkable or crosslinked material.

Furthermore, foam mouldings are preferred whose resiliences and elasticity is at least sufficiently great so that the original shape is re-established substantially, i.e., for example, to at least 75%, on 50% compression after 1 hour at 20° C.

Furthermore, foam mouldings are preferred which are not dissolved by water or the organic solvents used and whose linear swelling in these media is less than 15%.

Furthermore, foam mouldings are preferred which can be compressed to at least 50% of their normal volume and which have specific gravities of less than 200 $kg/m^3$, particularly preferably less than 80 $kg/m^3$ and in particular from 5 to 50 $kg/m^3$.

The term "foam mouldings" here are also taken to mean three-dimensional networks and meshworks, bonded webs, laid fabric structures, knitted fabric structures, random-laid fabric structures and loop-laid fabric structures, so long as they meet the criteria above.

The liquid, flameproofing impregnation can be, for example, solutions, emulsions, dispersions or slurries which contain at least one component which is liquid at room temperature, i.e. acts in the moist state. The liquid component imparts pliability and/or flowability on the impregnation. The liquid component is preferably an aqueous phase. However, non-aqueous liquids and mixtures thereof with water are also possible. Examples of nonaqueous liquids are alcohols, esters, ketones, ethers, aliphatic and aromatic hydrocarbons, halogenated hydrocarbons and any desired mixtures of these liquids.

The non-aqueous liquids may also be those which, after impregnation, are converted into a state which is mechanically stronger or more resistant to weathering as a consequence of chemical processes, for example by oxidation, hydrolysis and/or crosslinking. Suitable examples here are methylol compounds, polyisocyanates, isocyanate prepregs, air-drying coating resins, water-crosslinkable silicone compounds and air-curing polymerization-capable compounds, optionally in activated form, in each case optionally in solution or, for example, in aqueous dispersion. The liquids preferably do not attack the foam mouldings, only impair their resilience slightly, not at all or even improve it, and can generally not be swollen by more than 15%, preferably only less than 10%, even though higher degrees of swelling are possible in principle.

For fire prevention and toxicological reasons, flameproofing impregnations based on water or based on aqueous solutions and/or dispersions containing or representing inorganic and/or organic binders are preferred. Liquid, flameproofing impregnation which can be used are, for example, commercially available, optionally intumescent flame retardant paints for wood or metals, in particular those based on water.

Besides binders, the impregnations generally contain inorganic and/or organic fillers and auxiliaries. The auxiliaries can have the purpose, for example, of adjusting or modifying in a desired manner the rheological properties, the colour, the surface tension, the odour, the solids/water ratio, the sedimentation, the biological stability, the ageing protection, the intumescence, the reflectivity, the thickening, the pH and/or the corrosion protection.

Although the moist binder which is present in the impregnation and which can also be the only component of the impregnation provides the impregnation with the ability to penetrate into the foam moulding and with pliability at room temperature, the flexibility of the foam moulding being principally retained, the binder need not necessarily remain flexible after drying. However, binders which still have a certain inherent flexibility even after drying are preferred. The flexibility of the foam mouldings is frequently sufficient to provide the fire retardant elements according to the invention with adequate stability to vibration and mechanical impact even after drying.

Suitable binders for the impregnations are inorganic and/or organic materials, preferably in aqueous formulation. The same applies to the auxiliaries and/or fillers optionally to be bound with the binders. Fillers generally improve the flameproofing considerably.

Preferred binders, fillers and auxiliaries are those which are water-insoluble or are converted into a water-insoluble or sparingly water-soluble state during or after drying. Binders may also be converted into a water-insoluble state by reaction with components of the air or reaction with fillers or auxiliaries, for example additional crosslinking agents.

Suitable inorganic binders are, for example: alkali metal silicate solutions, solutions or dispersions of silica sols, mixed silicates, cements, plasters, magnesium oxychloride, phosphates and phosphonates of zinc, magnesium and/or aluminum, other sulphates, phosphates and/or borates of ammonia, amines or metals of the first to third group of the periodic Table of the Elements, suitable phosphates being metaphosphates, pyrophosphates, polyphosphates and phosphonates in addition to orthophosphates, and suitable borates also being polyborates.

Preferred preparations are those which contain film-forming components, for example silicate solutions, or these which develop binder properties in the case of fire, for example phosphoric acids, boric acids, in particular neutral and sparingly soluble ammonium phosphates and ammonium polyphosphates, in each case optionally coated or encapsulated in order to modify the solubility. It is of course also possible to use combinations of different binders and fillers.

Organic aqueous binders may be, for example, aqueous solutions and/or dispersions of organic binders, preferably plastic latices or dispersions having optionally (auto)crosslinking properties. It is also possible to use organic solvents or organic binder solutions, but they are not preferred.

Suitable organic binders are, for example: water-soluble proteins and carbohydrates, for example various sugars and oligomers thereof, molasses, vinasses, sulphite waste liquors, starches, celluloses and the modification and degradation products thereof, albumin products, case-ins, natural gums, polycarboxylic acids and salts thereof, poly(vinyl ethers), poly(vinyl alcohols), polyacrylamides, polyethers, poly(alkylene oxides), polyvinylpyrrolidones, polyacetals, polyurethanes, polymethylol compounds based on phenols, ureas, dicyandiamide, melamine, polyvinylamides, polymers based on methacrylic, acrylic, maleic, fumaric or itaconic acid and their metal, ammonium and imide salts, and copolymers which are more or less watersoluble and contain such groups. Polymer latices or dispersions are preferably employed, for example those based on polymers or copolymers of olefins, cycloolefins or diolefins; aliphatic, araliphatic and/or aromatic polyolefins, vinyl ethers, vinyl esters, vinylamides, (meth)acrylates, -amides or -nitriles, in particular based on substantially aliphatic species, for example ethylenevinyl acetate copolymers, ethylene-vinyl alcohol copolymers, ethylene-(meth)-acrylic acid copolymers, ethylene-(meth)-acrylate copolymers having 1 to 20 C atoms in the alcohol part, copolymers of ethylene, propylene, butene, isobutene, diisobutene, octadecene, styrene and/or vinyl acetate with maleic, fumaric and/or itaconic acid, and the partial esters thereof, based on poly(alkylene oxide) polymers, for example of ethylene oxide and/or of propylene oxide and the modification products thereof, for example graft polymers of polyurethanes, collophony, bitumen, natural and synthetic rubber polymers, and dispersions of polyamides, saturated polyesters, unsaturated polyesters, alkyd or other coating resins.

The plastic dispersions or binder solutions preferably used are those which achieve good water resistance after drying. Particularly preferred are latices or dispersions of butadiene or (ethyl) acrylate copolymers or ethylene-vinyl acetate copolymers having ester contents of from 10 to 85, preferably 15 to 50, %, since these have good adhesion and flexibility and weathering stability along with good absorption capacity for fillers and provide the impregnations with freedom from dust.

Optionally plasticized latices of poly(vinyl chloride) and its copolymers or of polychloroprene and its copolymers are also suitable.

Since most of the binders mentioned still do not provide the impregnations with flameproofing, the impregnations generally additionally contain fillers whose task is to provide flameproofing. Flameproofing fillers are, for example, the hydroxides, oxides and oxidehydrates of magnesium, aluminum and iron, borates, polyborates, in particular those of the second main group of the Periodic Table which are capable of eliminating water, for example colemanite, borocalcite, zinc borate and magnesium borate, graphite and expandable graphites, for example those containing included nitrogen oxide or sulphur dioxide, expandable borates, borosilicates, alkali metal silicates, alumosilicates, mica, vermiculites, perlites, calcium sulphates in all stages of hydration, Portland cement, aluminous cement, pozzolanic cement and Sorel cement, watercontaining zeolites, silicates, silicas, ammonium phosphates, in particular ammonium polyphosphates, amine phosphates, for example ethylenediamine polyphosphate and neutral ethylenediamine orthophosphate, phosphates of melamine and phosphates of calcium, magnesium, aluminium and other metals of the second, third and/or eighth main group of the Periodic Table, in particular those which are capable of eliminating water or ammonia. Fillers which do not eliminate water and also organic fillers which are able to reduce the combustibility or fire load, such as carbonates, silicates, oxides, chalks, dolomite, iron oxides, titanium dioxide, copper oxides, boron oxides, vanadium oxides, wollastonite, kaolin, talc, glass, ashes, slags, carbon, powdered rock, powdered coal, powdered wood, powdered fruit stones or powdered straw, phenolic resins, poly(vinyl chlorides), melamine, melamine resins, urea resins, composts, ores, cellulose powders and asphalts. Such fillers may be, for example, in the form of fibres, needles, powders, spheres, hollow spheres, foam particles, leaves, dumbells or in other geometrical shapes, and then also serve as reinforcing materials.

Preferred fillers are those which are 5% or less soluble in water at room temperature and which also provide the impregnation or the fire retardant element with an intumescent action, i.e. an increase in volume occurs under the action of flames. Preferred fillers are also those whose average grain diameter is less than 3 mm, particularly preferably less than 1 mm, in particular less than 0.1 mm (for example 1 to 30 μm).

The ratio between the binder and the dispersant or solvent and the filler may be varied within broad limits. When stipulating this ratio, the impregnation capacity of the foam moulding, the resultant viscosity of the impregnation preparation, the content of organic fire load in the overall system and the final mechanical stability desired are usually observed The binder:filler weight ratio can be, for example, from 1 to 35:99 to 65 (both calculated as solids). This ratio is preferably in the range 5 to 20:95 to 80. The weight ratio between the total solids content and the solvent or dispersant can be, for example, from 50 to 85:50 to 15. This ratio is preferably in the range 60 to 80:40 to 20. It is also possible to use higher proportions of solvent or dispersant if desired, for example in order to achieve simple through-impregnation.

The fire retardant elements according to the invention preferably have limiting oxygen indices (LOI) greater than 25%, preferably greater than 35%, particularly greater than 40% (measured in accordance with ASTM 2863).

Particularly preferred limiting oxygen indices are generally achieved when the fillers co-used are calcium sulphate hydrate, magnesium hydroxide, aluminium hydroxide, ammonium polyphosphates and/or melamine phosphates. The fire classification in accordance with DIN 4102 then frequently corresponds to classes B1 or A 2.

Impregnations of particular interest are those which contain as binders, besides other auxiliaries, dispersions of acrylate and/or vinyl ester copolymers, for example ethylene-vinyl acetate copolymers, and as fillers magnesium hydroxide, aluminum hydroxide, colemanite, ammonium polyphosphate, ethylenediamine phosphate, melamine, expandable graphite and/or glass powder. Preferred impregnations of this type are themselves preferably used for impregnation of elastic polyurethane foams having specific gravities of less than 80 kg/m$^3$, the specific gravity after impregnation and drying of the fire retardant element produced in this way being at least twice, preferably more than three times, as great as the specific gravity of the unimpregnated foam moulding employed in each case.

The impregnation mixture preferably has a pH in the range 5 to 9, particularly preferably 6 to 7.5. Impregnation of the foam moulding can take place homogeneously or inhomogeneously, partially or completely. Homogeneously here means that all the foam moulding is impregnated to a uniform density. Inhomogeneously here means that certain regions of the foam moulding have absorbed more impregnation mixture or more solids from the impregnation mixture than other regions of the foam moulding. For example, the region in the vicinity of the surface may have absorbed more solids from the impregnation mixture after impregnation than internal regions, so that a type of sandwich or layered structure is produced. It is also possible for a change in the composition of the impregnating agent between the vicinity of the surface and the internal regions to take place due to separation processes during impregnation and/or during later drying. This is frequently even desirable in the case of intumescent impregnations since the intumescence takes effect more effectively in the outer region. Fire retardant elements according to the invention may, for example, only be provided with the impregnating agent partially (such as on one side), only externally, only at points or only in a pattern (such as in a grid pattern). The entire foam moulding is preferably impregnated homogeneously or so that the region in the vicinity of the surface contains more of one or all components of the impregnation mixture than the internal regions. An example of the last-mentioned type of impregnation is the production of a fire retardant element with a concentration of intumescent components in the outer region and a concentration of ceramic-producing components in the interior.

Preferred fire retardant elements according to the invention contain a soft polyurethane foam which can be compressed reversibly, a resilient latex foam, melamine resin foam or a resilient voluminous fibre bonded web, in each case having a specific gravity of 5 to 80 kg/m$^3$, preferably 15 to 50 kg/m$^3$. The impregnation used is preferably a slurry having a solids content of 15 to 85%, preferably 50 to 70%, and adjusted to pH values between 5 and 9, preferably 6.5 to 7.5, for example of aluminum hydroxide, magnesium hydroxide, calcium borate, plaster, glass, alkali metal silicates, chalk and/or ammonium (poly)phosphate in water and/or plastic latices, preferably in latices or dispersions of natural or synthetic rubberelastic polymers, in particular of copolymers of vinyl acetate or ethyl acrylate with ethylene. Based on the filler weight, the binder content is preferably between 3 and 30%, preferably between 5 and 15% by weight. The slurry of the impregnation mixture (with water) is preferably adjusted to viscosities between 50 and 35,000 cP, particularly preferably between 100 and 3,500 cP, in each case measured at room temperature. Preferably, between 100 and 1,200, particularly preferably between 200 and 800, % by weight of solids are introduced into the foam mouldings, based on its specific crude weight, by the impregnation process, which can be carried out, for example, at 5 to 90° C., preferably at 15 to 45° C. In addition, amounts of impregnating agent which, on the compression of the impregnated foam moulding by about 30% by volume, do not drip out of the latter are preferred. If appropriate, the impregnation can be modified by addition of thixotropic agents or other auxiliaries which set hydraulically and/or result in thickening due to precipitation processes, swelling processes or chemical reactions after a certain storage time. Suitable materials for this purpose are, for example, optionally modified starch, celluloses, polyacrylamides, montmorillonites, gelatins, vegetable meals, soaps, plaster, cement, silicas, carboxamides, fibre materials, precursors of hydrolytically produced hydroxides of silicon, iron, aluminum and magnesium, polycarboxylic acids, polyureas and alkali metal silicates.

Fire retardant elements according to the invention can be produced in a very wide variety of geometrical shapes, for example as pourable granules, for example having average diameters between 5 and 50 mm, in the shape of defined mouldings, for example profiles, sheets, bandages, rolls, brick-like, tubular or container-like shapes. They are installed in the moist state. In the moist state, the fire retardant elements are elastic. The elasticity only reduces on drying, but, at the same time, the adhesion to the surrounding materials, the mechanical strength and hardness increase. Drying or partial drying of watermoist fire retardant elements is not absolutely necessary just to achieve the fire retardant effect. Even after drying, a certain vibrational resistance, toughness and ductility is retained, with the result of reduced brittleness compared with purely inorganic fire retardant elements. Binders and any (residual) moisture which may have been added or is present or any hygroscopy present can effect dust-free machining of fire retardant elements according to the invention, even after drying thereof.

Since the fire retardant elements according to the invention are to be installed in the moist state, i.e. in the impregnated state, but not in the dried and/or cured state, they are either produced directly before installation or, preferably, they are used in prefabricated form, in which case they must be packaged after production until installation. Depending on the composition of the impregnation mixture used, the packing must then be substantially impermeable to organic solvents, reactive resins or carbon dioxide (for example in the case of silicate binders) or to oxygen (in the case of air-drying coating resins as binders) or to water vapour (in the case of aqueous impregnations).

Prefabricated water-moist fire retardant elements are advantageously packed using polyolefin films or milk carton composite material. 100% impermeability of the packing is frequently not absolutely necessary since escape of some of the moisture incorporated with the impregnation and/or partial curing taking place during the storage time may if desired prevent dripping of impregnation agents and/or shorten the drying or curing times after installation of the still-moist and flexible fire retardant elements.

The fire retardant elements according to the invention can be used, for example, as joint sealant tapes, fire retardant bandages, fire retardant covers, fire stops, fire retardant layers, fire retardant coatings, fire retardant pipes, fire retardant centre split pipes, sealant elements, sheets, prisms or granules. They can be rendered intumescent, for example, using customary intumescent paints or impregnations containing alkali metal silicate, vermiculite, perlite, ammonium phosphates or expandable graphite and can then be used as fire retardant sleeves for plastic pipes or pipe ducts. In this case, for example, a procedure can be adopted in which, under the action of flame, the intumescence is concentrated inwardly through an external metal cover and a protected pipe is compressed in the case of fire.

The fire retardant elements according to the invention can also be finished in a manner such that they become ceramic in the case of fire, for example through the combination of aluminum hydroxides with phosphates or borates (such as colemanite) or through the concomitant use of polyphosphates, marl or glass powder. By admixing, for example, asphalts, graphites, phenolic resins, melamine resins, carbohydrates, celluloses and/or acrylonitrile polymers, which, under endothermic conditions, result in intensive coking, good flame resistance can likewise be achieved.

Fire retardant elements according to the invention generally adhere well to one another and to the surrounding materials and, even themselves, have good impermeability to smoke, in particular in the compressed installation state, which makes them particularly highly suitable for construction of cable and pipe partitions of good smoke resistance. It may in some cases be advantageous to provide the fire retardant elements according to the invention with reinforcements in order to achieve good stability so long as they are still readily compressible. Reinforcements can, for example, be inserted into the fire retardant elements and/or attached to them by means of wire. Relatively small ducts, in particular, for example through fire walls, can be sealed without problems using reinforced fire retardant elements, in the same way as using bricks or building panels. This can be provided even during construction, i.e. points can be pre-planned which, although sealing the room in a fire resistant manner, can at any time be provided with cable ducts without producing dust.

Particular embodiments of the invention below are characterized by the following features.

They comprise foam mouldings which are reversibly compressible, are impregnated with a moist, flame-proofing impregnation and are flexible in this moist state, are protected and stored against loss through moisture and are installed in this moist, flexible state, whereupon the moisture contained is able to escape while the original soft, flexible character solidifies.

Foam mouldings contain them which and are substantially impregnated through in a homogeneous manner.

Foam mouldings contain them which and are impregnated partially, in a sandwich manner or inhomogeneously.

They contain water.

They contain, as binders in the impregnation, an ethylene homopolymer and/or copolymer dispersion which forms a film at room temperature.

They contain, in the water-moist impregnation, a dispersion of aluminium hydroxide and/or magnesium hydroxide and a binder.

They contain, in the water-moist impregnation, glass in powder and/or bead form, for example so-called microbeads.

They contain polyphosphates in the water-moist impregnation.

They contain borates in the water-moist impregnation.

They contain a non-aqueous liquid phase in the impregnation.

They intumesce in the case of fire.

They become ceramic in the case of fire.

They are protected, before installation, by a suitable packing against loss of moisture.

The particular embodiments above can each be achieved alone or in any combinations, which are not mutually exclusive. It is also possible to produce devices for preventative protection against the spread of fire from the fire retardant elements according to the invention.

EXAMPLES

The parts and percentages stated relate here, as also in the general description, to the weight, unless otherwise stated.

The examples below were carried out using reticulated soft polyurethane foams, as are otherwise used for mattresses and cushions, more precisely using foam PU A, specific gravity 45 kg/m$^3$, polyether type, foam PU B, specific gravity 22 kg/m$^3$, polyether type, and foam PU C, specific gravity 52 kg/m$^3$, polyester type

EXAMPLE 1

Commercially available alkyd resin varnish (yacht varnish) was diluted in the weight ratio 1:2 using petroleum ether of boiling range 50 to 90° C.

A mixture of 100 parts of pentaerythritol, 50 parts of secondary ammonium orthophosphate, 50 parts of potato starch, 50 parts of magnesium hydroxide, 50 parts of melamine and 50 parts of aluminum hydroxide were ground for 24 hours in a ball mill. 300 parts of the powder obtained were stirred with 150 parts of the dilute coating solution to form a dispersion. The viscosity thereof was 1,200 CP at 24° C.

Foam PU C in the form of an ashlar measuring 10×10×15 cm (=78 g) was milled with this dispersion, all the impregnating agent (450 g) being taken up. The impregnated ashlar was stored in an aluminium box at room temperature for 2 weeks, then removed. It was flexible and compressible, and no impregnating agent emerged on compression moulding. The foam piece was then pressed into a joint 10 cm deep, 6 cm wide and 15 cm long between two foamed concrete blocks, where it adhered flush with the wall and level with the surface. The entire structure was then left to stand for 4 weeks at room temperature. During this time, the solvent volatilized and the yacht varnish crosslinked. The foam pressed into the joint was now hard, and, although it could be pressed in, it exhibited virtually no resilience. It was thus no longer flexible and reversibly compressible, but instead had become ductile. The cured foam also adhered firmly to the surrounding walls and produced a seal.

When the joint was heated with a natural gas blow lamp which achieved a temperature of about 1,200° C., the joint seal behaved intumescently, i.e. the joint material foamed at the point of flame treatment and formed an in sulating carbonization foam. When the flame was removed, no continued combustion was observed.

EXAMPLE 2

A block of foam PU B measuring 10×10×15 cm was milled with 900 g of a solution which had been produced by vigorously stirring 100 parts of 25% strength sodium waterglass with 7 parts of diethyl pyrocarbonate, the entire solution being taken up. Over the course of a few hours, during which the impregnated foam was stored in a sealed polyethylene bag, the pyrocarbonate reacted with the waterglass and gelled. The increase in viscosity which took place during this time held the waterglass in the foam. After 4 weeks, the soft block, which was still elastic and resilient, was removed from the packing and pressed into a joint as described in Example 1. It fitted very closely and sealed the joint. The entire structure was then left to stand in an interior room at room temperature for 3 months. During this period, the water evaporated and the foam block solidified. After 4 months, the joint filling was hard and impermeable to smoke. On flame treatment, slight intumescent foaming occurred, but no combustion and smoke was observed. Testing of the joint in accordance with DIN 4102 in a small fire chamber (ETK) showed that no temperature increase to above 150° C. could be observed on the side away from the flame after 90 minutes. The limiting oxygen index (LOI) was greater than 40%.

EXAMPLE 3

A slurry of 300 parts of commercially available retarded gypsum finish, 50 parts of 30% strength polychloroprene latex and 150 parts of water was produced This mixture had a viscosity of 1,300 cP after 3 minutes at room temperature A piece of foam PU B measuring 10×10×15 cm was milled with this mixture, 500 g being taken up. The ashlar impregnated in this way was stored for 5 weeks at 25° C. welded into a polyethylene bag, during which period no impregnation ran out and the good flexibility was retained. After pressing the flexible and reversibly compressible material into a joint as described in Example 1, it was left to dry at room temperature for 2 months. The joint filling was then tough, hard, ductile and only a little resilient after compression. It could be drilled without producing dust and could easily be penetrated using a screwdriver.

In the small fire chamber test as described in Example 2, no temperatures of greater than 150° C. were measured on the side away from the flame after 60 minutes. The classification B 1 was achieved in the fire shaft test in accordance with DIN 4102. The limiting oxygen index (LOI) was greater than 50%.

EXAMPLE 4

150 parts of a commercially available elastic ethylene-vinyl acetate copolymer latex which is water-resistant after drying-on and is present in a 25% dilution (Wacker Chemie, Burghausen), 50 parts of water, 350 parts of aluminium hydroxide (commercially available grade, B2 Bayer AG), 3 parts of iron oxide red pigment and 50 parts of commercially available ammonium polyphosphate were stirred to form an impregnation formulation which had a pH of 6.8 and a viscosity of 2,100 CP at 23° C. A piece of foam PU A (=68 g) measuring 10×10×15 cm was milled vigorously with 600 g of this solution, all the impregnation being taken up. The impregnated foam was welded into polyethylene film. After 6 months, it was still fully flexible and elastically resilient. The block was pressed into a joint as described in Example 1 and left to dry. After drying for 4 weeks at room temperature, the joint filling had a leather-like, tough, slightly indentable consistency. Adhesion to the joint flanks was excellent.

On flame treatment, virtually no smoke evolution was observed, a combustion duration of 90 minutes was survived in the small fire chamber test without the rear temperature increasing to 150° C., and the fire shaft test in accordance with DIN 4102 was passed by the material with class B 1. The limiting oxygen index (LOI) was greater than 40%.

The same result was achieved using the ponding joint component which had been stored initially for 7 days under water at 19° C. and then dried at room temperature.

EXAMPLE 5

200 parts of aluminum hydroxide, 200 parts of glass microbeads (Ballotini 5000), 100 parts of ammonium polyphosphate, 5 parts of titanium white pigment (in each case in commercially available grade and having average particle sizes of less than 60 μm) were stirred with 150 parts of the latex described above in Example 4 and 50 parts of water. This impregnation liquor had a viscosity of 1,900 cp at 20° C. Two blocks of foam PU A measuring 10×10×15 cm were each heavily impregnated with 600 g of this impregnation liquor, and two further corresponding foam blocks were each impregnated with 1,100 g of the impregnation liquor. In all four cases, only a little excess liquor ran off on moderate compression. The impregnated blocks were stored for 3 months, welded into polyethylene film. During this period, no liquor ran out of them.

(a) A sample of each of the foams impregnated with different amounts was then installed into a test joint as has been described in Example 1. Both foam mouldings were easy to handle, were highly flexible and could readily be introduced into the joint, where they were easily in contact with the walls to provide a seal. After drying, a firmly adherent bond to the flank material had occurred in both cases, and the joints were impermeable to smoke. In both cases, the joint filling material had a tough, hard character, survived impact with a hammer without chipping and could be drilled without producing dust and penetrated easily with a screwdriver. In the fire shaft test, a B 1 classification was achieved with both materials. The limiting oxygen index (LOI) was greater than 40% in both cases. When the two joints were tested in the small fire chamber test, 90 minutes without a temperature increase to 150° C. on the side away from the flame were achieved. The joints remained impermeable to smoke. After the fire experiment, the fire retardant elements were removed. It was apparent that the surfaces of the joint filling materials had become ceramic to form a solid sinter cake, which indicates reliable joint sealing over a relatively long period of time to come.

(b) The two other blocks with moist impregnation were dried for 3 days at 70° C. in a circulation oven and were then at constant weight. When the blocks were measured, no dimensional change compared with the original, non-impregnated foam moulding was apparent. The two blocks now had a tough, hard character and specific gravities of 340 and 620 kg/m³.

EXAMPLE 6

A mat of foam PU A of thickness 5 cm, width 10 cm and length 150 cm and having a trapezoidal cross-section was impregnated with 4,500 g of the impregnation also used in Example 5, and rolled up. The roll was welded into polyolefin film and retained its flexible, elastic character for a period of at least 6 months.

A still-moist roll of this type was then wound in one layer around a current cable of diameter 3.5 cm, covering the surface. After drying, the bandage adhered firmly to the cable insulation, and the areas of contact of the bandage layers applied in the form of a seal were bonded firmly to one another. The covering did not detach on its own and had a tough, hard character. The specific gravity was 500 kg/m³.

The covered zone of the cable prepared in this way was passed through a small fire chamber in a manner such that the protected zone was in the flame cone of the burner. The oven was heated in accordance with ETK (DIN 4102). It remained operative even after 60 minutes and only slight smoke development occurred.

An unprotected cable flame-treated at the same time tailed after 16 minutes due to short-circuiting. Considerable smoke development occurred before and after.

EXAMPLE 7

A piece of thickness 24 cm, width 25 cm and length 50 cm was cut out of foam PU B. Holes of various diameters were introduced on the centre line of this piece, at 12.5 cm, which passed through the thickness of 24 cm. The foam block was then impregnated with 750 g of the impregnation also used in Example 4 per litre of foam volume. Cables of appropriate diameters were subsequently passed through the holes into the flexible foam block which could be stored in the moist state. The foam block was then installed in a fire wall with compression to 70% of its original volume. The compression was effected by loading with foamed concrete elements and cementing with the latter. On compression, the moist, flexible foam component surrounded the cable insulation to form a seal. After drying, the cables were bonded firmly to the tough, hard foam material and were impermeable to smoke. Adhesion of the partition material to the walls of the fire wall duct was very good.

EXAMPLE 8

The procedure employed was as in Example 7, but the foam block with holes was cut on the centre line through all the holes. The cable duct block was thus divided into two halves, which were then impregnated. The halved, moist, flexible, elastic block was now fitted with cables much more easily since they no longer had to be threaded in. After drying, the two halves were bonded firmly to one another to provide a seal. The entire cable partition was tough and hard and was not destroyed by movements of the cables.

EXAMPLE 9

An opening measuring 40×70 cm was left free in a fire wall of wall thickness 24 cm. A sheet of foam PU A of original dimensions 50×90×24 cm which had been impregnated with 800 g of the same impregnation mixture as used in Example 5 per litre of foam volume was inserted into this opening. On insertion of this sheet, it had to be compressed, and no impregnation dripped out. 8 cables were passed through the still-moist sheet, the cable ends having been provided with an attachable steel tip before penetration. The cables, which were in this way passed through the moist partition material without difficulties, were immediately surrounded by the partition material to provide a seal. After drying, a tough, hard bond having good impermeability to smoke had been produced. In the dried and compressed state of the partition, the partition material had a specific gravity of 580 kg/m³.

EXAMPLE 10

A round hole of diameter 12.5 cm and 25 cm was in each case cut into a foamed concrete wall (wall thickness 20 cm). For these holes, round plugs of diameters 16 and 30 cm and length 20 cm in each case were cut out of the foam PU A. The plugs were then finished with the impregnation also used in Example 4 (800 g/l of foam volume). They could be stored for as long as desired in the moist state protected against drying-out without the impregnation running out. These plugs, in the moist, elastic state, were inserted into the holes of the foamed concrete wall to a depth of 12 cm with slight compression. 10 telephone cables provided with a steel tip were then passed through the smaller plug and 20 through the larger plug at approximately equal distances from one another. These cables were immediately surrounded by the moist material of the plugs to provide a seal. After drying, a solid, tough, hard composite was present.

These cable partitions were tested in a small fire chamber in accordance with DIN 4102 (ETK). They were impermeable to smoke, even if the chamber was operated at an excess pressure of an approximately 2 mm water column (0.2 mbar). The plug surface and the cable insulation on the side away from the fire was less warm than 150° C. after 90 minutes.

EXAMPLE 11

An opening measuring 50×50 cm was left free in a fire wall of thickness 24 cm. This opening was sealed with moist foam mouldings of the PU A type, which were reversibly compressible and had been finished with 500 g of the impregnation also used in Example 4 per litre of foam volume. These fire retardant elements had the dimensions 10×10×20 cm. The opening was sealed under compression using 6 layers of 3 of these foam mouldings each, so that a protective wall of approximate thickness 10 cm was produced. After drying, it was possible to drill the bonded, tough, hard wall element (specific gravity: 400 kg/m³) without producing dust and to provide it with cables. It could also be worked using knives and screwdrivers and drilled without producing dust.

On flame-treatment in the small fire chamber (ETK), the wall element did not achieve temperatures greater than 150° C. on the side away from the fire after 60 minutes. The fire classification of the partition material in the fire shaft test gave the class B 1.

EXAMPLE 12

The procedure followed was as in Example 11, but the 500 g of impregnation per litre of foam moulding was only incorporated on the surface by rolling in the impregnation mixture, so that the concentration of impregnation material in the regions in the vicinity of the surface was considerably greater than in the interior of the foam moulding.

After drying, the fire retardant elements produced in this way had a specific gravity of, on average, 620 kg/m³ in the first 2 cm surface layer, while it was only about 180 kg/m³ in the core region.

These fire retardant elements could be stored and installed comparably well to the fire retardant elements produced in accordance with Example 11. The fire tests resulted in virtually the same results as the fire tests of fire retardant elements produced in accordance with Example 11.

EXAMPLE 13

The foam ashlars also used in Example 11 were treated on opposite surfaces to a depth of about 4 cm with the impregnation solution also used in Example 4. 780 g/l of impregnation mixture were taken up per litre of foam volume in the impregnation zone. The ashlars impregnated in this way now had a type of sandwich structure. They were reversibly compressible in the moist state and were used, as described in Example 11, to seal an opening in a fire-protection wall, where the impregnated parts were stood vertically one on top of the other. On storage in the moist state, the geometry of the impregnation was essentially retained. As regards mechanical strength and fire behaviour, the fire partition sealed analogously to Example 11 exhibited virtually the same favourable behaviour as the fire partition in Example 11 after drying.

EXAMPLE 14

A 5 cm thick mat of latex foam used for the production of mattresses was impregnated with 600 g of the impregnation mixture also used in Example 4 per litre of latex volume. The mat was cut into parts measuring 1×2 m, which were rolled up and welded whilst still moist into polyethylene film. They could then be stored virtually as long as desired.

Webs 30 cm wide were cut out of the moist mat and placed on a cable route with a U-shaped cross-section and an internal width of 25 cm. The moist mat formed a trough-like shape in the cable route by fitting to the U-shaped cross-section. The cable was placed on the moist mat shaped in this way and subsequently covered with a further piece of the moist mat in a manner such that the flanks of the lower piece and of the covering, curved moist mat were in contact at the edges. After drying, the mats were bonded, and formed a tough, hard fire protection for the cable lying between them.

EXAMPLE 15

A commercially available, film-forming polyurethane dispersion was diluted with water to a solids content of 20%, and 200 parts of this dispersion were mixed with 50 parts of commercially available ammonium polyphosphate, 200 parts of aluminum hydroxide and 150 parts of glass powder to form an impregnation liquor having a viscosity of 1,900 cp at 25° C. and a pH of 7. Using this liquor, a pipe made of foam PU B (wall thickness 3 cm, internal diameter 3 cm) was impregnated using 700 g/l of foam volume. This pipe was welded whilst moist into polyolefin film. It remained flexible and reversibly compressible.

After a storage time of 12 weeks and after removing the polyolefin film, three telephone cables were placed through this pipe, and the pipe was then, in the moist state, placed in a S-shape on a cable rack of width 30 cm. After drying, the cable was in a shape-stable protective sleeve.

On flame-treatment in a small fire chamber, the cable remained operative for longer than 60 minutes. After removal from the fire chamber, it was apparent that the protective sleeve had been substantially converted into a ceramic state.

EXAMPLE 16

The procedure followed was as in Example 15, but the polyurethane dispersion was replaced by a commercially available styrene-butadiene copolymer latex as is otherwise employed for the production of carpet backing coatings. The tests carried out as in Example 15 led to results analogous to Example 15.

EXAMPLE 17

The procedure followed was as in Example 15, but the polyurethane dispersion was replaced by a poly(vinyl acetate) dispersion as is commercially available for the production of moisture-resistant bonds. The tests carried out as in Example 15 led to results analogous to Example 15.

After drying, however, the protective sleeve had higher mechanical strength and adhered more strongly to the cable rack.

Examples 15 to 17 indicate prototypically that cable runs with a complicated shape can also advantageously be provided with fire retardant elements according to the invention.

EXAMPLE 18

75 parts of a commercially available 60% strength latex of ethylene-vinyl acetate copolymer (vinyl acetate content 50%) were mixed with 125 parts of water, 50 parts of melamine phosphate, 2 parts of iron oxide red pigment and 350 parts of lump gypsum with addition of 1.2 parts of dibutyl phosphate. The mixture had a viscosity of 2,300 cp at 20° C.

A second impregnation mixture was produced in which the lump gypsum was replaced by 500 parts of red mud from aluminium manufacture (solids content 70%).

A third impregnation mixture was produced in which the lump gypsum was replaced by 500 parts of a 1:1 mixture of aluminium hydroxide and glass microbeads (average bead diameter 25 μm) and 2 parts of dibutyl phosphate. The viscosity was 1,300 cP at 23° C.

Using these three mixtures, an ashlar of foam PU B measuring 10×10×50 cm was in each case impregnated with 600 g/l of foam volume. In all three cases, highly flexible fire retardant elements were obtained which retained their flexibility in the moist state (even in the case of lump gypsum). On storage for 6 months (welded into polyethylene films), no impregnation ran out.

In the joint experiment and subsequent combustion experiment as described in Example 2, highly adherent, tough, hard seals were obtained in all three cases. In all three cases, the rear temperature did not increase to greater than 150° C. over 90 minutes, and the fire classification in accordance with DIN 4102 achieved B 1.

The material containing glass beads formed a solid sinter cake in the flame-treatment region in the combustion experiment in the small fire chamber.

What is claimed is:
1. A fire retardant element, which is
   (a) a foam moulding which is elastic in the moist state and
   (b) contains a liquid flameproofing impregnation, where one or both of (a) and (b) solidify after installation, and the fire retardant element is protected against loss of moisture before installation.
2. A fire retardant element according to claim 1, in which component (a) is a soft polyurethane foam or a foam moulding based on asbestos foam, a mineral fibre foam, a silicone foam, a phosphazene foam, a mixed inorganic/organic foam, a cellulose foam, a protein foam, a natural sponge, a phenolic resin foam, an urea resin foam, a melamine resin foam, a dicyandiamide resin foam or a polyimide resin foam, a foam based on natural or synthetic rubber which has been foamed in dispersion, solution or directing, a polyolefine, a polyacrylate, a polyamide, a polyether, a polyester, a poly(vinyl halide), a poly(vinyl ester) or a poly(vinyl ether).
3. A fire retardant element according to claim 1, in which the foam moulding has a pore number of from 5 to 500 per cm$^2$, a permeability to air of 20 to 250 l per 100 cm$^2$ at a thickness of 5 cm and a reduced pressure of 10 Pascals, resilience and elasticity sufficiently great so that the original shape is re-established to at least 75% on 50% compression after 1 hour at 20° C., a linear swelling of less than 15% on exposure to component (b), a compressibility to at least 50% of the normal volume and a specific gravity of less than 200 kg/m$^3$.
4. A fire retardant element according to claim 1, in which component (b) is a solution, emulsion, dispersion or slurry which contains at least one component which is liquid at room temperature.
5. A fire retardant element according to claim 1, in which component (b) contains an aqueous phase.
6. A fire retardant element according to claim 1, which contains a binder, a filler and auxiliaries, the latter adjusting or modifying the rheological properties, the colour, the surface tension, the odour, the solids/water ratio, the sedimentation, the biological stability, the ageing protection, the intumescence, the reflectivity, the thickening, the pH and/or the corrosion protection.
7. A fire retardant element according to claim 1, which contains a binder selected from the group consisting of an alkali metal silicate solution, a solution or dispersion of a silica sol, mixed silicates, a cement, a plaster, a magnesium oxychloride, a zinc phosphate, a magnesium phosphate, an aluminum phosphate, a zinc phosphonate, a magnesium phosphonate, an aluminum phosphonate, a sulphate, an orthophosphate, a metaphosphate, a pyrophosphate, a polyphosphate, a phosphonate, a borate and/or a polyborate of ammonia, an amine or a metal of the first to third group of the Periodic Table of the Elements, and which contains a filler selected from the group consisting of a hydroxide, oxide and/or oxide hydrate of magnesium, aluminum and/or iron, a borate, a polyborate, graphite, an expandable graphite, an expandable borate, a borosilicate, an alkali metal silicate, an aluminosilicate, mica, vermiculite, a perlite, a calcium sulphate, Portland cement, aluminous cement, pozzolanic cement and/or Sorel cement, a water-containing zeolite, a silicate, a silica, an ammonium phosphate, a phosphate of melamine, a phosphate of calcium, magnesium, aluminum, or other metal of the second, third or eighth main group of the Periodic Table and/or a carbonate, an oxide, a chalk, dolomite, a titanium dioxide, a copper oxide, a boron oxide, a vanadium oxide, wollastonite, Kaolin, talc, glass, an ash, a slag, powdered rock, powdered coal, powdered, wood, powdered fruit stones and/or powdered straw, a phenolic resin, a poly(vinyl chloride), melamine, a melamine resin, an urea resin, composts, an ore, a cellulose powder and/or an asphalt, where the binder: filler weight ratio is from 1 to 35:99 to 65 and the weight ratio between the total solids content and the solvent or dispersant is from 50 to 85:50 to 15.

8. A fire retardant element according to claim 1, which additionally contains at least one component selected from the group consisting of a phsophoric acid, a boric acid, a neutral and sparingly soluble ammonium phosphate, an ammonium polyphosphate, an aqueous plastic latice or plastic dispersion, a water-soluble protein, a carbohydrate, a polycarboxylic acid, a salt of a polycarboxylic acid, a poly(vinyl ether), a poly(vinyl alcohol), a polyacrylamide, a polyether, a poly(alkylene oxide), a polyvinylpyrrolidone, a polyacetale, a polyurethane, a polymethylol compound based on a phenol, urea, dicyandiamide, melamine, polyvinylamide, a polymer based on methacrylic acid acrylic acid, maleic acid, furmaric acid or ithaconic acid and their metal, ammonium and imide salts and copolymers which contain such a component.

9. A fire retardant element according to claim 1, in which the non-volatile content of the impregnation is greater than 59% by weight of the original foam moulding.

10. A process for the production of a fire retardant element, in which
  (a) a foam moulding which is elastic in the moist state is impregnated with
  (b) a liquid flameproofing impregnation at temperatures in the range of 5 to 90° C., and the fire retardant element is protected against loss of moisture before installation.

11. A moulding, which essentially comprises
  (a) a foam moulding which is elastic in the moist state and
  (b) a liquid flameproofing impregnation, where (a) and/or (b) solidify on drying after installation, and the moulding is protected against loss of moisture before installation.

* * * * *